United States Patent
Jaber et al.

(10) Patent No.: US 10,288,127 B2
(45) Date of Patent: May 14, 2019

(54) METHOD FOR CONNECTING THE ROTOR OF AN ELECTRIC MOTOR TO AN ELEMENT THAT IS TO BE DRIVEN

(71) Applicant: SAFRAN LANDING SYSTEMS, Velizy Villacoublay (FR)

(72) Inventors: Sylvain Jaber, Velizy-Villacoublay (FR); Vincent Bellenger, Velizy Villacoublay (FR); Nicolas Moretti, Velizy-Villacoublay (FR); Gilles Eluard, Velizy-Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 71 days.

(21) Appl. No.: 15/685,195

(22) Filed: Aug. 24, 2017

(65) Prior Publication Data

US 2018/0058510 A1    Mar. 1, 2018

(30) Foreign Application Priority Data

Aug. 26, 2016 (FR) ...................................... 16 57967

(51) Int. Cl.
*F16D 9/06* (2006.01)
*H02K 7/14* (2006.01)
*F16D 3/72* (2006.01)
*H02K 7/00* (2006.01)

(52) U.S. Cl.
CPC ................. *F16D 9/06* (2013.01); *H02K 7/14* (2013.01); *F16D 3/72* (2013.01); *H02K 7/003* (2013.01)

(58) Field of Classification Search
CPC ..... F16D 9/06; F16D 9/08; F16D 3/06; F16D 3/12; F16D 3/66; F16D 3/72; F16F 15/12353; H02K 7/00; H02K 7/10; H02K 7/14; H02K 7/003
See application file for complete search history.

(56) References Cited

FOREIGN PATENT DOCUMENTS

DE          2538975 A1      3/1977
JP          2008-256068 A   10/2008

OTHER PUBLICATIONS

Siemens English Translation DE 2538975 (Year: 1977).*
French Search Report of FR 1657967, dated Jun. 14, 2017.

* cited by examiner

*Primary Examiner* — Jason L Vaughan
*Assistant Examiner* — Amanda Kreiling
(74) *Attorney, Agent, or Firm* — Sughrue Mion, PLLC

(57) ABSTRACT

The invention relates to a method for connecting in rotation an output member (5) of an electric motor (1) and an element (2) that is to be driven in rotation, comprising the use of at least one fusible pin (11) that links the output member and the element that is to be driven, and that has at least one section that is prone to fail in shear when a torque transmitted by the fusible pin exceeds a predetermined threshold. The method comprises the step of interposing, between the pin and either the output member or the element that is to be driven, at least one elastic member (20) comprising a first travel with a first stiffness followed by a second travel with a second stiffness greater than the first stiffness.

6 Claims, 2 Drawing Sheets

METHOD FOR CONNECTING THE ROTOR OF AN ELECTRIC MOTOR TO AN ELEMENT THAT IS TO BE DRIVEN

The invention relates to a method for connecting the rotor of an electric motor to an element that is to be driven, permitting protection from large torques, and making it possible to verify proper operation of the motor.

BACKGROUND OF THE INVENTION

In the field of aviation, it is proposed to motorize the wheels of aircraft using electric motors to allow the aircraft to move on the ground without using the engines. However, during landing, the wheels are made to rotate suddenly, which makes it necessary to protect the output member of the motor in order to prevent damage, wherein the output member can be the rotor of the motor if the motor is in direct engagement, or the output of a reduction gear interposed between the rotor and the wheel.

It has been proposed to interpose a multi-disc clutch or a dog in order to selectively separate the output member from the wheel during landing, and to connect it to the wheel only when the speed of the aircraft drops below a certain threshold.

Separation makes it possible to implement various types of test. Indeed, when the wheel is separated from the motor, it is possible to energize the motor in order to verify that it is rotating properly, using a supply current that remains below a certain threshold for a given speed of rotation. This test can be carried out on the ground, or prior to landing. Furthermore, it is possible, prior to landing, to test the resistive torque of the wheel by connecting it to the output member and making it rotate, by means of which it is possible to identify a problem in the bearings of the wheel. However, the weight of these solutions is often prohibitive. Furthermore, these devices imply breakdown risks that have to be taken into account in the design of the aircraft, and maintenance operations (lubrication, inspection, replacement of consumable elements . . . ).

It has also been proposed to use pins which extend between the output member and the element that is to be driven, for example in a double clevis type assembly, and which are calibrated to fail in shear when the torque transmitted by the pins exceeds a certain threshold (referred to as fusible pins). This connection is much more simple and requires no maintenance apart from periodic replacement of the pins. However, the motor is permanently connected to the wheel, making it impossible to test the motor independently of the wheel. Indeed, if, prior to landing, the motor is energized and an abnormal resistance is detected, it is impossible to determine whether the resistance is caused by the motor or by the wheel.

OBJECT OF THE INVENTION

The invention relates to a connecting method, using fusible pins, between the output member of a motor and an element that is to be driven in rotation, which nonetheless makes it possible to test the motor independently of the element that is to be driven.

SUMMARY OF THE INVENTION

To that end, there is proposed a method for connecting in rotation an output member of an electric motor and an element that is to be driven in rotation, comprising the use of at least one fusible pin that links the output member and the element that is to be driven, and that has at least one section that is prone to fail in shear when a torque transmitted by the fusible pin exceeds a predetermined threshold. According to the invention, the method comprises the step of interposing, between the pin and either the output member or the element that is to be driven, at least one elastic member comprising a first travel with a first stiffness followed by a second travel with a second stiffness greater than the first stiffness.

Thus, in order to test the proper operation of the motor, all that is necessary is to block the element that is to be driven, and to energize the motor. The latter must normally drive the pin against the first stiffness of the elastic member. By monitoring the current supplied to the motor, it is possible to verify that the resistive torque of the motor remains below a certain threshold, including the resistance opposed by the elastic member. Then, once this test has been carried out, the element that is to be driven is released and the motor is again energized. By monitoring the current supplied to the motor, it is possible to verify that the resistive torque of the rotating assembly remains below a predetermined threshold. Finally, in operation, the second, stiffer travel makes it possible to progressively increase the transmission torque once the elastic member has absorbed the first travel, preventing abrupt docking.

According to one advantageous feature of the invention, the two ends of the pin are engaged in one of the output member or the element that is to be driven, and a central portion of the pin extends in the other of the output member or the element that is to be driven, the elastic member being mounted so as to act on the central portion of the pin.

BRIEF DESCRIPTION OF THE DRAWINGS

The invention will be better understood in light of the description of a particular mode of implementation of the method of the invention, with reference to the figures of the appended drawings, in which.

DETAILED DESCRIPTION OF THE INVENTION

Figure 1:
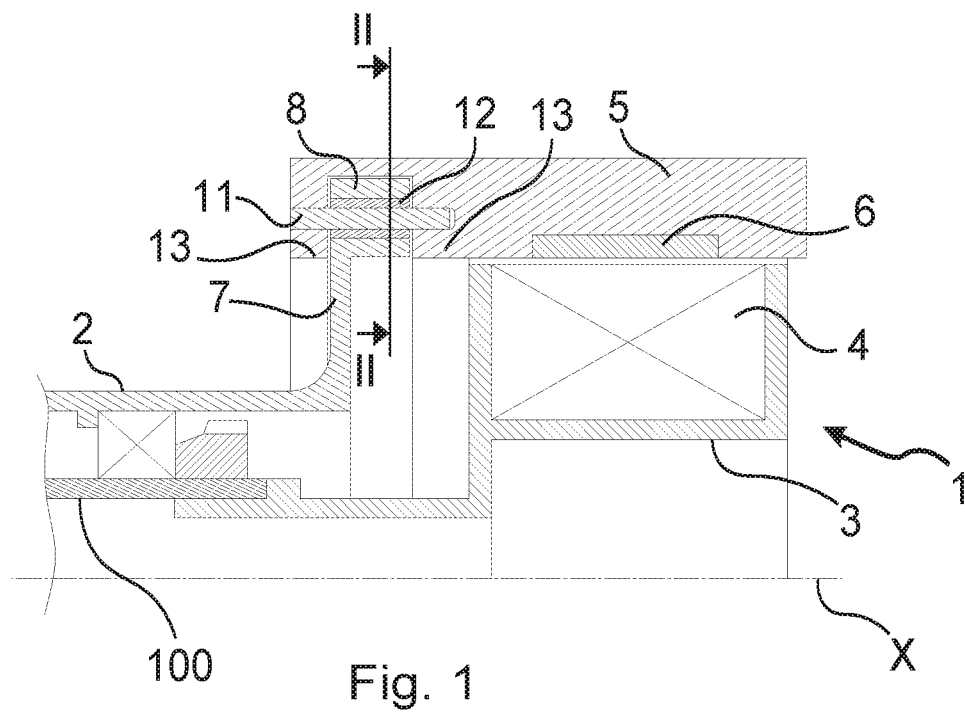
FIG. 1 is a schematic view in section of a motor whose rotor is coupled, via a fusible pin, to an element that is to be driven.
Figure 2:
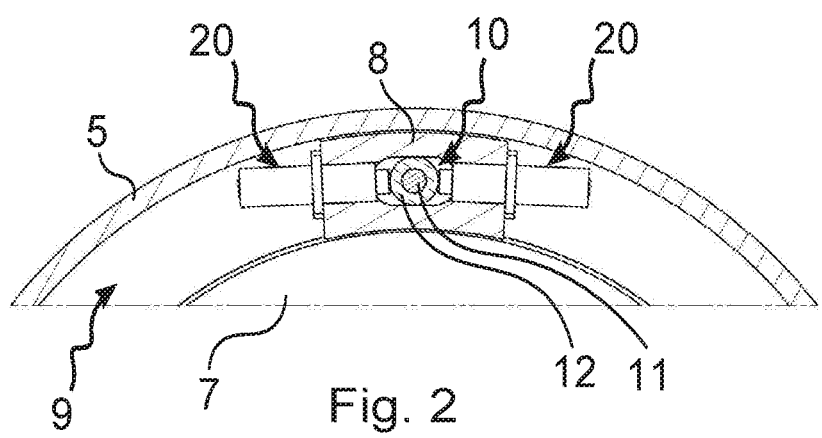
FIG. 2 is a view in section along line II-II in FIG. 1.

The invention relates to the connection between a motor 1 and an element that is to be driven in rotation, in this case for example an aircraft wheel 2, of which the end of the hub is shown here and which is mounted so as to rotate on an axle 100 about an axis of rotation X. In this case, the motor 1 is mounted coaxially with the wheel 2 and comprises a stator 3 (fixed for example to the axle of the wheel) that receives a winding 4. Furthermore, the motor comprises a rotor 5 which is mounted so as to rotate about the stator 3 and which comprises permanent magnets 6 to interact electromagnetically with the winding 4 of the stator 3. A flange 7, of which the periphery is provided with a projection 8 that is received in a channel 9 of the rotor 5, is attached at the end of the hub of the wheel 2. The projection has, created in it, an opening 10 of oblong section, into which extends a fusible pin 11, that is in this case covered by a sleeve 12 on its central portion and whose ends are received in tight openings created in flanks 13 of the rotor that delimit the channel 9. The projection 8 also bears two elastic members 20 which are attached either side of the projection so as to project into the opening 10 and engage with the fusible pin 11.

Figure 3:
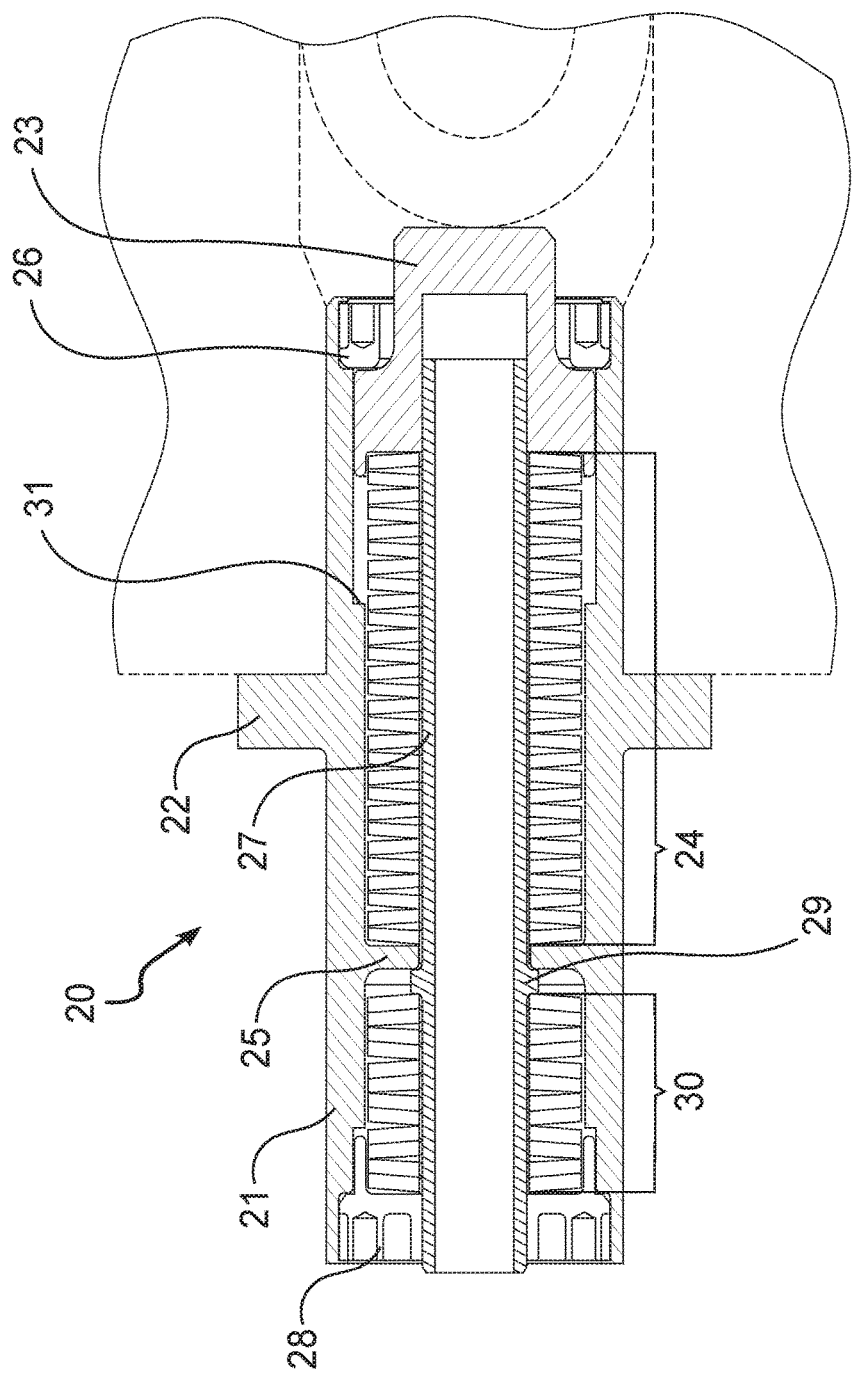
FIG. 3 is a view in longitudinal section of one of the elastic buffers interposed between the pin and the element that is to be driven.

As shown more particularly in FIG. 3, each elastic member 20 comprises a cylindrical body 21 of which the exterior is engaged in an opening of the projection 8 until abutment of a collar 22 projecting from the body 21. The means for attaching the elastic member 20 to the projection are not shown here. Each elastic member 20 comprises a pusher 23 that is mounted so as to slide in the body 21 while projecting from one end of the latter so as to contact the sleeve 12 of the fusible pin 11. A first row of Belleville washers 24, defining a first stiffness, bears on one hand against a bearing face of a diaphragm 25 extending inside the body 21, and acts on the pusher 23 so as to push it towards the fusible pin 11, being in this case arrested by a first arresting nut 26 screwed into a first end of the body 21. The pusher 23 can be pushed into the body 21 counter to the force generated by the first row of washers 24, until it abuts against the end of an internal tube 27 that passes through the diaphragm 25 such that an opposite end of the tube 27 slides into a second arresting nut 28 screwed into a second end of the body 21. The tube 27 comprises a collar 29 that is pushed against the diaphragm 25 by a second row of Belleville washers 30, bearing against the second arresting nut 28.

When the pusher 23 is pushed back by the fusible pin 11, the pusher 23 travels a first travel during which it is acted upon by the first row of washers 24, which imposes a first stiffness. The first travel finishes when the pusher 23 encounters the tube 27. Then, the pusher 23 travels a second travel during which it pushes back the tube 27, and is therefore acted upon by the second row of washers 30 which works in parallel with the first row of washers 24 and which therefore adds its stiffness to the stiffness of the first row of washers, such that the stiffness experienced by the pusher during this second travel is greater than the first stiffness. This second travel finishes when the pusher comes to abut against an internal shoulder 31 of the body 21.

The assembly operates as follows. At rest, the pushers 23 of the two elastic members 20 press on either side of the sleeve 12 of the fusible pin 11 so as to centre the latter at the middle of the oblong opening. The pushers 23 are therefore slightly spaced apart from the nut 26.

During a test of proper operation of the motor 1, for example prior to landing, the wheel 2 is prevented from rotating (for example using the brake fitted to the wheel), and the winding 4 of the motor is energized, which produces a torque on the rotor 5 urging it to rotate. If the rotor 5 is not blocked (for example due to seizing of the bearings of the motor), it causes the fusible pin 11 to move in the oblong opening 10 so as to push back the pusher 23 of one of the elastic members 20 against its first row of washers 24. The current supplied to the motor is sufficient to push back one of the pushers against the force produced by the first row of washers 24, but is not sufficient to push back the pusher against the force produced by the second row of washers. It is therefore possible to detect whether the supply current remains below a predetermined threshold for an angular travel of the rotor that corresponds to the first travel of the loaded elastic member. If this is not the case, it is because something is impeding the rotation of the rotor, and an inspection alert is then generated.

The test is then continued by releasing the wheel and re-energizing the motor 1 to verify whether the wheel is rotating freely. Similarly, it is ascertained whether the supply current remains below a predetermined threshold. Below this load, the pushers are not pushed back and torque is transmitted between the rotor 5 and wheel 2 without the elastic members being compressed.

In service, when torque is transmitted between the rotor and the wheel 2, for example when the wheel is made to rotate during landing, or when the motor is energized to cause the wheel to rotate and the aircraft to move on the ground, one of the pushers 23 is pushed back over the first travel until it engages in the second travel, which causes the driving force to rise rapidly, without producing a jolt that might impair the strength of the various loaded elements. The second row of washers thus serves as a filter and as protection against jolts when the torque rises.

Preferably, the fusible pin 11 is dimensioned so as not to experience fatigue at normal torques encountered in routine operation of the aircraft, but to fail in shear if the transmitted torque were to exceed a given threshold, typically three to five times the fatigue torque, in order to protect effect the motor and avoid any force on the wheel that would tend to block the latter in an undesired manner.

The invention is not limited to the above, but rather encompasses any variant that falls within the scope defined by the claims. In particular, it would be possible to provide multiple fusible pins to connect the output member of the motor to the element that is to be driven in rotation, each pin being associated with at least one elastic member, one being sufficient if the transmitted torque is always in the same direction. The elastic members can be mounted either on the element that is to be driven, as described here, or on the output member of the motor.

Although the elastic means presented here are rows of Belleville washers, it is possible to use other elastic means such as coil springs. A damping means may be added thereto.

The invention claimed is:

1. A method for connecting in rotation an output member (5) of an electric motor (1) and an element (2) that is to be driven in rotation, comprising the use of at least one fusible pin (11) that links the output member and the element that is to be driven, and that has at least one section that is prone to fail in shear when a torque transmitted by the fusible pin exceeds a predetermined threshold, characterized in that the method comprises the step of interposing, between the pin and either the output member or the element that is to be driven, at least one elastic member (20) comprising a first travel with a first stiffness followed by a second travel with a second stiffness greater than the first stiffness.

2. The method according to claim 1, in which the two ends of the pin are engaged in one of the output member or the element that is to be driven, and a central portion of the pin extends in the other of the output member or the element that is to be driven, the elastic member being mounted so as to act on the central portion of the pin.

3. The method according to claim 1, in which the elastic member (20) comprises a body (21) in which a pusher is mounted so as to slide and project from the body in order to engage with the fusible pin (11), wherein the pusher can be pushed back by the fusible pin counter to a first elastic means (24) then, after the first travel, counter to a second elastic means (30) acting in parallel with the first elastic means.

4. The method according to claim 3, in which the first elastic means (24) is arranged between the body and the pusher in order to push back the latter, while the second elastic means (30) is arranged between the body and an internal tube (27) against which the pusher comes to abut at the end of the first travel.

5. A method for testing the proper operation of the electric motor, connected to an element that is to be driven as per the connecting method according to claim 1 comprising the step of blocking the rotation of the element that is to be driven, supplying a supply current to the motor, and verifying whether, for an angular travel of the motor corresponding to the first travel of the elastic member, the supply current does not exceed a predetermined threshold.

6. The method for testing the proper operation of the element that is to be driven, connected to the output member of a motor as per the connecting method according to claim 1, comprising the step, after carrying out the test of blocking the rotation of the element that is to be driven, supplying a supply current to the motor, and verifying whether, for an angular travel of the motor corresponding to the first travel of the elastic member, the supply current does not exceed a predetermined threshold, of supplying a supply current to the motor, and verifying whether the supply current does not exceed a predetermined threshold.

* * * * *